(12) United States Patent
Dubey et al.

(10) Patent No.: US 11,797,495 B2
(45) Date of Patent: Oct. 24, 2023

(54) SIMULATING DATA DEFINITION TRIGGERS IN A DATABASE SYSTEM

(71) Applicant: Oracle International Corporation, Redwood Shores, CA (US)

(72) Inventors: Avinash Dubey, Bangalore (IN); Ashish Kumar, Bangalore (IN); Andras Belokosztolszki, Cambridge (GB); Vinay Sachdev, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 927 days.

(21) Appl. No.: 15/277,838

(22) Filed: Sep. 27, 2016

(65) Prior Publication Data

US 2017/0293619 A1 Oct. 12, 2017

Related U.S. Application Data

(60) Provisional application No. 62/321,130, filed on Apr. 11, 2016.

(51) Int. Cl.
*G06F 16/21* (2019.01)
(52) U.S. Cl.
CPC .................. *G06F 16/211* (2019.01)
(58) Field of Classification Search
CPC ................................................. G06F 16/211
See application file for complete search history.

(56) References Cited

U.S. PATENT DOCUMENTS

| 6,112,196 | A * | 8/2000 | Zimowski ............. G06F 9/5033 707/999.009 |
| 6,460,043 | B1 * | 10/2002 | Tabbara ............... G06F 16/2452 |
| 9,659,040 | B1 * | 5/2017 | Bellingan ............. G06F 16/211 |
| 2007/0198484 | A1 * | 8/2007 | Ahmed .................... G06F 16/28 |
| 2009/0150396 | A1 * | 6/2009 | Elisha ............. G06F 16/24565 |
| 2010/0257194 | A1 * | 10/2010 | Kalyanaraman .... G06F 16/2455 707/769 |
| 2011/0320439 | A1 * | 12/2011 | Gruschko ............... H04L 67/10 707/722 |
| 2012/0317076 | A1 * | 12/2012 | Zhu ......................... G06F 16/25 707/626 |
| 2014/0214895 | A1 * | 7/2014 | Higgins ............... G06F 16/3325 707/770 |
| 2014/0279834 | A1 * | 9/2014 | Tsirogiannis ........... G06F 16/86 707/602 |
| 2015/0363492 | A1 * | 12/2015 | Laredo ..................... G06F 9/54 707/770 |

(Continued)

FOREIGN PATENT DOCUMENTS

KR 2005-0121778 A * 12/2005 ............. G06F 15/00
WO WO-2013135133 A1 * 9/2013 ............... G06F 8/71

*Primary Examiner* — Ken Hoang
(74) *Attorney, Agent, or Firm* — Hickman Becker Bingham Ledesma LLP

(57) ABSTRACT

Techniques are described herein for simulating triggers in a database. A database server receives a query that targets a database managed by the database server. The database server is registered with a plugin that determines whether the query is a particular type of query. If so, plugin sends a message to an external process that includes features of the query. The database server can also execute the query regardless of whether the particular type of query is detected.

20 Claims, 3 Drawing Sheets

(56) References Cited

U.S. PATENT DOCUMENTS

2015/0363493 A1\* 12/2015 Laredo ................ G06F 16/2291
  707/770
2016/0253361 A1\* 9/2016 Nguyen ................ G06F 16/213
  707/769

\* cited by examiner

SIMULATING DATA DEFINITION TRIGGERS IN A DATABASE SYSTEM

CROSS-REFERENCE TO RELATED APPLICATIONS; BENEFIT CLAIM

This application claims the benefit of Provisional App. No. 62/321,130, filed Apr. 11, 2016, under 35 U.S.C. § 119(e). The entire contents of this document are hereby incorporated by reference as if fully set forth herein.

FIELD OF THE INVENTION

The present invention generally relates to simulating triggers in a database, and more specifically, to using a plugin (i.e., plug-in) to trigger an action in response to detecting that a database query will modify a database data definition or data structure.

SUMMARY OF PROBLEMS

Operations that add, modify or delete the data that is contained in database structures are referred to as Data Manipulation Language (DML) operations. On the other hand, operations that create, modify or drop the database structures themselves are referred to as Data Definition Language (DDL) operations. Database systems often provide triggers that are activated in response to events. For example, a MYSQL database server provides an interface to define DML triggers that are activated before or after data is added, modified, or deleted.

DML triggers can be useful in many situations. For purposes of illustrating a clear example, assume the following:
  A database for website has a first table named "Users" and a second table named "LoginHistory";
  A trigger is defined to be activated in response to the database server inserting a new record in the users table;
  The trigger, when activated, inserts a new record, in the LoginHistory table, with data that associates the new record in the LoginHistory table with the new record in the users table and includes a current timestamp.

Accordingly, in response to the database server processing a query that causes the database to insert a new record in Users table with a particular identifier, the database activates the trigger. The trigger inserts a new record in the LoginHistory table, and populates the new record in the LoginHistory table with the particular identifier, which associates the new record in the LoginHistory table with the new record in the Users table, and includes a timestamp that represents the current time that the user logged in.

Most database systems are hardcoded to support triggers that are activated in response to particular DML events, such as when data in a table is added, modified, or deleted. However, not all database systems support triggers for all types of operations. When a database system does not have hardcoded support for triggers for a particular type of operation, a database administrator may wish to simulate triggers that are activated in response occurrence of that particular type of operation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

TERMS, MEANINGS, AND EXAMPLES

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

For purposes of illustrating clear examples of the subject matter discussed in this disclosure, one or more meanings or examples may be associated with one or more terms throughout this disclosure. However, each meaning or example associated with each term is not meant to be exclusive. Furthermore, words, such as "or" may be inclusive or exclusive unless expressly stated otherwise. The following is a non-exclusive list of meanings and examples of particular terms used throughout this disclosure, one or more terms in the following list may be associate with one or more additional meanings or examples later discussed herein.

A "computer" may be one or more physical computers, virtual computers, and/or computing devices. As an example, a computer may be one or more desktop computers, laptop computers, mobile devices, cloud-based computers, and cloud-based cluster of computers, virtual computer instances or virtual computer elements such as virtual processors, storage and memory, and/or any other special-purpose computing devices. Any reference to "a computer" herein may mean one or more computers, unless expressly stated otherwise.

A "server computer" may be a computer that receives, processes, and/or responds to one or more requests from one or more client computers.

A "server program" may be a program that is executed on a server computer that receives requests for a client program on a client computer.

A "database server" or "database server program" may be a server program that receives requests to store, modify, or retrieve data from a data repository, referred to as a database.

A "database" is a collection of data stored in one or more data structures. For example a database may be a collection of tables. Each table may have one or more columns and one or more rows. One or more rows in one table can be related to one or more rows in another table. However, a database server may manage more than one database. For example, a database server may manage and receive queries for one data in one or more databases with separate data structures.

A "client" or "client computer" may be a computer, or a process running on a computer, that the requests data from, or sends data to, a server computer.

A "process" may be an instance of a computer program executed on a computer. Processes are each allocated separate computing A process that is "external" to another process may be a process that is allocated separate computing resources, such as processor time and memory space. One process that is external to another process may be restricted, by a computer or operating system, from using the computing resources of another process. For example, a process that is external to another process may not store or access data in a memory space allocated to the other process.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A database system may be hardcoded to support triggers that are activated in response to certain events, such as DML operations. Unfortunately, the same database system may fail to support triggers that are activated in response to other events. For example, a database administrator may want to define a trigger that is activated by the database server in response to an event that manipulates a database schema, or how data is defined, stored, or organized in the database. However, some databases, such as a MYSQL database, do not have hard-coded support for triggers that fire for some types of operations, such as DDL operations. Support for triggers that fire on DDL operations (and any other types of operations for which the database system does not provide hard-coded trigger support) may be useful in many situations, such as replication (discussed further herein).

Example System for Simulating Triggers

Figure 1:
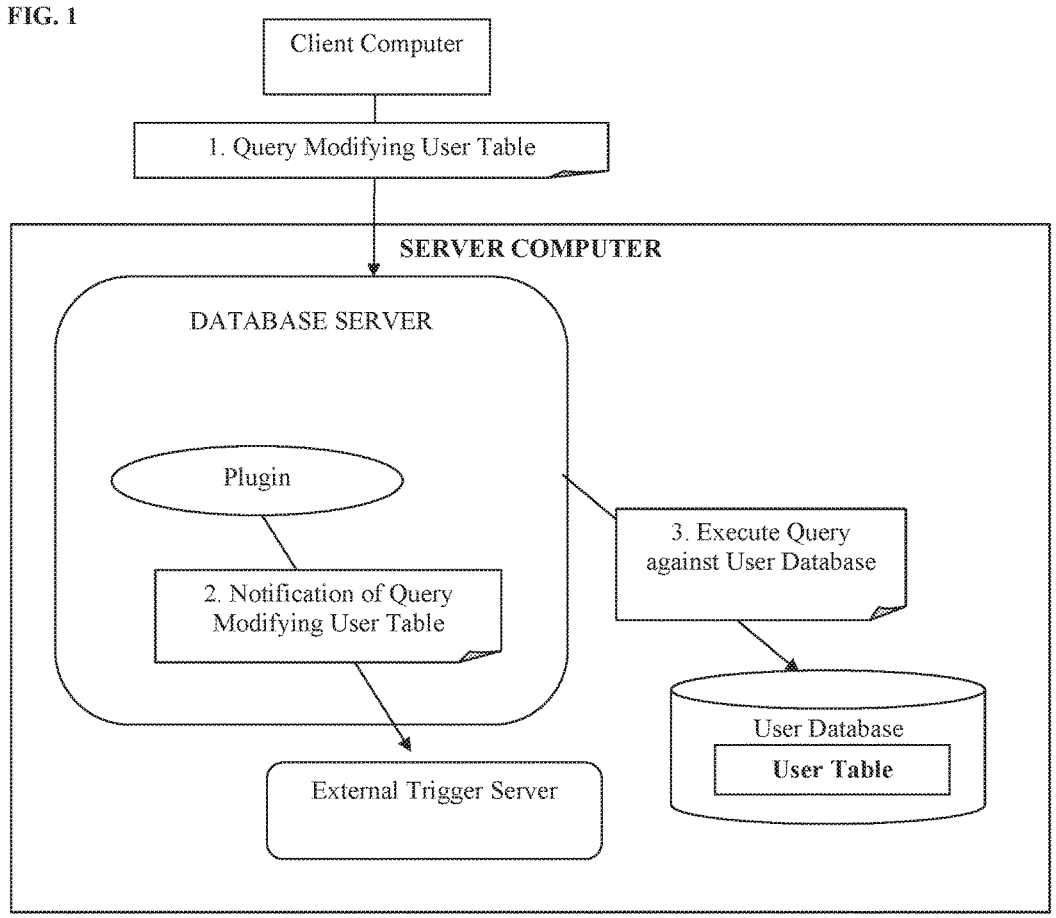
FIG. 1 illustrates a system and method for simulating one or more triggers that a database is not hardcoded to activate in response to one or more events based on a type of query received, in an example embodiment.

FIG. 1 illustrates a system and method for simulating one or more triggers that a database is not hardcoded to activate in response to one or more events based on a type of query received, in an example embodiment. In FIG. 1, the system comprises a Server Computer that is communicatively coupled to a Client Computer. The Server Computer is executing a Database Server (in an embodiment, the Database Server is a MYSQL database server) and an External Trigger Server. The Server Computer also has, or has access to, volatile or non-volatile storage that is storing one or more databases The External Trigger Server is a process that is external to the Database Server and can receive messages or notifications over a standard or proprietary Inter Process Communication (IPC) mechanism or networking protocol, such as the Transmission Control Protocol/Internet Protocol ("TCP/IP"), over one or more predetermined ports. In response to receiving a message, the External Trigger Server can perform one or more operations. Some example responses are discussed in detail further herein.

The Database Server is a process that can manage one or more databases (in an embodiment the one or more databases are MYSQL databases), receive queries, and execute queries against those databases. However, for purposes of illustrating a clear example, in FIG. 1, the Database Server manages, and the Server Computer has stored, a single database: "User Database". The Database Server supports plugins and has a Plugin registered with the database that is configured to detect whether a particular event will happen in response to determining whether a query is a particular type of query, and if so, send a message or "notification" to the External Trigger Server.

Additionally or alternatively, the user may receive a notification in response to a determination that a query is a particular type of query. For example, the Plugin may send the user a notification in real time in response to detecting the particular type of query. The user may then take various actions in response to the notifications. In some cases, the actions available to the user may depend on the type of notification and/or query. For example, if the particular type of query is a DDL that changes a table in the User Database, the Plugin may provide information regarding the query type and/or change details and may prompt the user to choose whether to make similar changes to a different table in the User Database and/or a different database.

Plugins

A plugin is a software component or module that adds a one or more features to an existing computer program. A computer program that supports a plugin enables the execution of the plugin via an Application Programming Interface ("API"). A plugin that is built according to a computer program's API, can be registered with the computer program after the computer program is generated by a compiler from source code. A plugin is not registered or referenced by the source code of the computer program, and is not incorporated into the computer program by a compiler. For example, after a database server is compiled and installed on a server computer, a plugin can be registered and loaded by the database server process while the server computer is executing the database server (at run-time). The database server may call one or more functions defined in the plugin at one or more times during execution as defined by the database server's API.

A plugin is different than a library. A library is referenced by the source code or the compiler when the source code is being compiled into the computer program (at compile-time). A computer program does not reference a plugin before the computer program is being executed.

A plugin may have limited functionality based on the API provided by the computer program. For example, in FIG. 1, the Database Server may not provide an API for the Plugin to give the Database Server a new or different query to execute. Additionally or alternatively, the Plugin may be logically positioned in the Database Server in a way that prevents the Plugin from directly instructing the Database Server to perform a new or different query. To add functionality that cannot be implemented into the plugin because of the Database Server's limited API, the plugin can send messages to an external process or server, such as External Trigger Server, to perform one or more tasks or operations.

Example Process for Simulating Triggers

In step 1, in FIG. 1, the Client Computer sends a query to the Database Server. In response, the Database Server sends the query, or one or more features of the query, to the Plugin. A feature of a query may be a keyword, identifier, or other element of the query. For purposes of illustrating a clear example, assume the query identifies the Users Database and includes the following Structured Query Language (SQL) query, which instructs the Database Server to add a new column to the User Table in the User Database:

Alter Table User Add Name Character(N)

According to the Database Server API, the Database Server calls a particular function defined in the Plugin if the Plugin defines the function. The function can analyze the query, or data derived from the query by the Database Server, and determine which operation(s) the Database Server did, or will, perform on which database object(s) in which database(s) in response to executing the query. Based on one or more of the factors above, in this example, the Plugin may determine whether the query is a particular type of query, and if so, proceed to Step 2, and send a notification to the External Trigger Server. External Trigger Server can perform one or more actions, such as update the schema of a copy of the User Table on a different server computer. The updated schema of the copy of the User Table may then have the new column, like the original copy of the User Table in FIG. 1.

Determining a Query is a Particular Type of Query

In Step 2, the Plugin determines whether the query is a particular type of query, and if so, sends a notification to the External Trigger server and/or performs another action. Continuing with the previous example, the Plugin determines that the query is a type of query that modifies the schema of a table, and in response, the Plugin sends a notification to the External Trigger Server. The notification may include the query, features of the query, or data derived from the query. A feature of a query includes, among other things, one or more of the following: the query; one or more keywords in the query; data that identifies the operation(s) that the query causes the database server to perform; data that identifies the query is a particular type of query, data that identifies one or more database objects referenced in the query; or any data in, or derived from, the query. In some cases, the External Trigger server may create a thread to process each request it receives and may have another thread which "listens" for requests from the Plugin so that the server does not miss requests even under a heavy load at the database.

Different queries may identify different operations to be performed by a database server on a database. For example, in SQL, one or more keywords in a query may indicate one or more operations that should be performed by the database server on a database identified in the query. For example, in a SQL database, "INSERT" is a keyword that instructs a database server to add a record to a table in the database; "CREATE" is a keyword that instructs a database server to create a table in the database; "ALTER" is a keyword that instructs a database server to modify a table in the database; "DROP" is a keyword that instructions a database server to remove a database from the database.

A query may be categorized into a particular type based on the operation(s) that the query caused, or will cause, the database server to perform, or data in the query. For example, a query that includes Data Definition Language ("DDL"), which causes a database server to change the schema of a database object, may be categorized as a DDL query (referred to a DDL query), which is a first example type of query. A schema change may include, among other things, creating a new table, removing a table, adding a column to a database or table, removing a column or table, changing the data type associated with a particular column, adding an index to a table, or changing any other objects or data structure defined in the database. A query that includes Data Manipulation Language ("DML"), which adds or removes data from a database object, may be categorized into another type of query (referred to herein as a DML query), which is a second example type of query. While the queries in these examples are categorized into a type based on the operation(s) that the query instructions the database is to perform, a query can be categorized based on other keywords or data in the query, or other data derived from the query.

Execute the Query

Returning to FIG. 1, whether or not the plugin continues to Step 2, the database server may proceed to Step 3, and execute the query against the database. Continuing with the previous example, the database server may add a column named "Name" to the User Table, and define the data type of values in the Name column to be a string of characters. Also for example, if the Database Server received a second query, and the Plugin determined that the second query is not a DDL query, then the Plugin does not send a notification to the External Trigger Server. But, the Database Server will still execute the second query. Although step 3 is discussed after Step 2, Step 3 may be performed before Step 2. Additionally or alternatively, the one or more actions taken by the External Trigger Server may be performed after Step 3 has been performed.

Example System and Process for Replication Using Simulated Triggers

Figure 2:
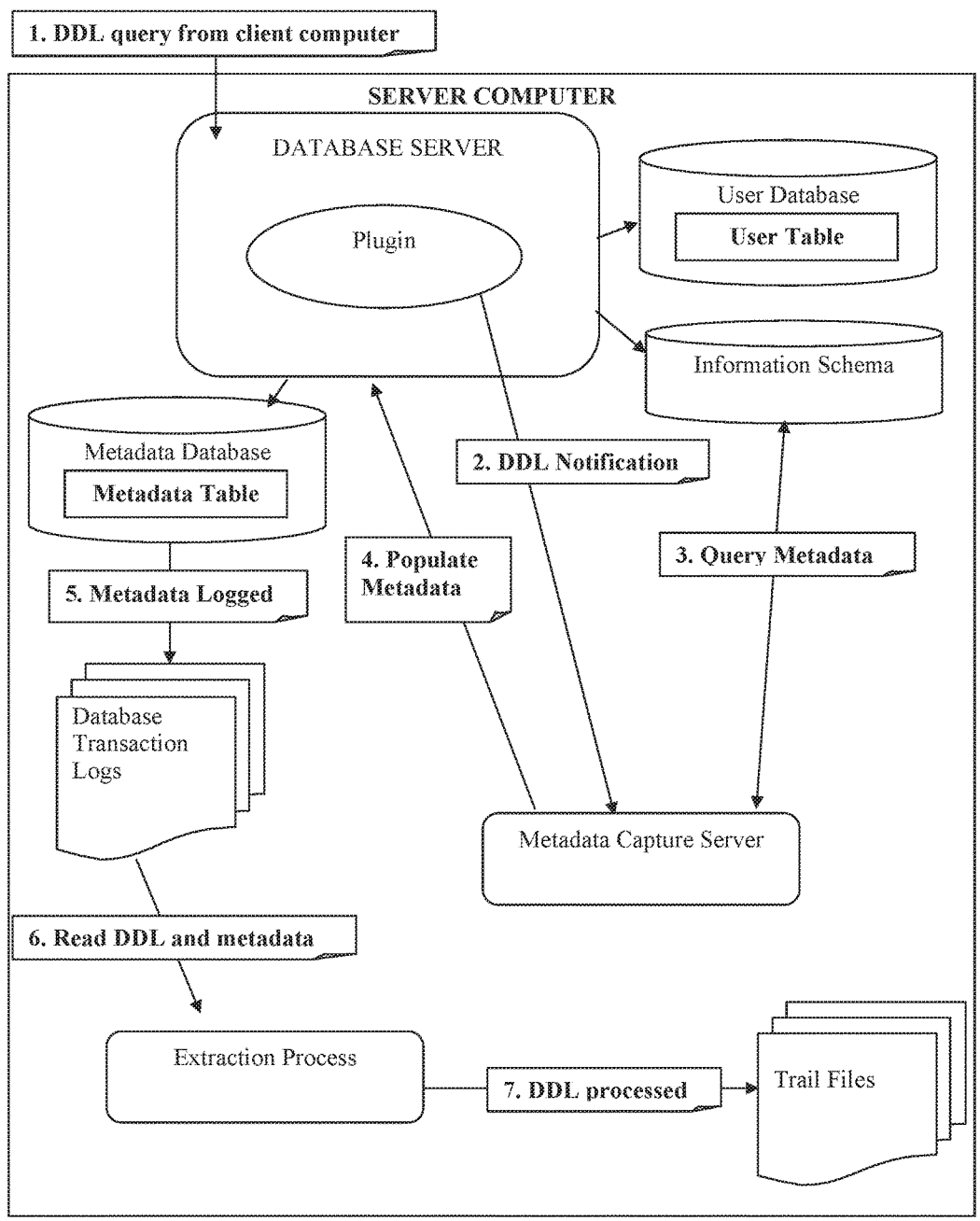
FIG. 2 illustrates a system and a process for replicating changes to a database using simulated triggers in an example embodiment.

There are many uses for simulating triggers. For example, a replication process can use simulated triggers to update replicated copies of a database. FIG. 2 illustrates a system and a process for replicating changes to a database using simulated triggers in an example embodiment. In FIG. 2, the system comprises a Server Computer that is coupled to a client computer (not illustrated in FIG. 2). The Server Computer (also in FIG. 1 and discussed above) is executing a Database Server (also in FIG. 1 and discussed above) and an external trigger process (as discussed above) referred to as the Metadata Capture Server in FIG. 2. The Server Computer also has, or has access to, volatile or non-volatile storage that is storing a plurality of databases: User Database (also in FIG. 1 and discussed above), Information Schema, and Meta Database. Each database may be stored differently, for example, User Database may be a relational database, and Information Schema may be a file or other data structure that includes the schema information for User Database and database objects within User Database, such as User Table. For example, Information Schema may store schema information of User Table (e.g., number of columns, number of rows, row and column titles, etc.). Information Schema may also store multiple schema versions of User Table. For example, whenever User Table is modified, Information Schema may retain any previous schema information of User Table while also storing an updated "snapshot" of User Table which includes schema information of the newly updated User Table.

The Database Server comprises a Plugin. The plugin receives queries from Database Server (as discussed herein) and determines whether a query is a particular type of query, and if so, notify Metadata Capture Server. Regardless of whether or not the Plugin sends a notification to Metadata Capture Server in response to receiving a query from Database Server, Database Server may execute the query.

The Server Computer also comprises Database Transaction Logs. The Database Transaction Logs identify the transactions (or updates) that have been committed (or applied) to Metadata Database or one or more other databases and can store the transactions as, e.g., events. Exemplary events may include: Query events, which indicate a beginning of a transaction and/or operation; TableMap events, which store metadata specific to tables logged into a transaction log; RowsLogEvents, which contain column data of tables for operations such as insert, delete, update, etc.; Xid events, which indicate commitment of a particular transaction; RotateEvents, which indicate an end of one transaction log and provide a name of a successor transaction log; and Stop events, which indicate that the server was stopped.

The Server Computer is configured to perform an Extraction Process. The Extraction Process is a process that reads the data from the Database Transaction Logs and generates Trail Files. Trail Files may comprise commands or data that instruct a replication process (not illustrated in FIG. 2) to recreate the target database on a computer.

While one or more of the processes, databases, or other components or objects are illustrated as if stored or executed on a single computer, each of the processes, databases, or other computing objects may be stored or executed on plurality of computers communicatively coupled over one or more computer networks. For example, Metadata Capture Server may be executed on a different computer than the Database Server or the computer storage system that stores the User Database.

Example Process for Replicating a Database using Simulated Triggers

In step 1, a client computer (not illustrated in FIG. 2) sends a DDL query to the Database Server. In response, the Database Server sends the query, or one or more features of the query, to the Plugin. For purposes of illustrating a clear example, assume the DDL query is the same query as discussed with regard to FIG. 1, and according to the Database Server API, the Database Server calls a particular function defined in the Plugin if the Plugin defines the function. The function analyzes the query and determines whether the query is a particular type of query. If the Plugin function determines that the query is a DDL query, then the Plugin proceeds to step 2. Regardless of whether the Plugin sends a notification to Metadata Capture Server, the Database Server may execute the query, which in this example, adds a new column named "Name" to the User Table in the User Database. The Database Server also updates the Information Schema so that the Information Schema includes an updated schema for the User Table, which identifies the new column—"Name"—and indicates that the data type is a character string. If the Plugin function determines that the query is a DDL query, the Plugin function may also parse the query to extract various information, such as identifiers of a target database and/or table.

In step 2, the Plugin sends a Notification to Metadata Capture Server. For example, after parsing the query, the Plugin may determine that the DDL query includes at least some DDL that references the User Table in the User Database. In response, the Plugin sends a DDL notification, to Metadata Capture Server, that indicates that the schema for the User Table in the User Database has been altered.

In step 3, the Metadata Capture Server receives the DDL notification and collects the modified schema information. Continuing with the previous example, the Metadata Capture Server determines that the User Table schema has been modified based on information in the DDL notification. In response, Metadata Capture Server gathers the modified schema from the Information Schema. Accordingly, in this example, Metadata Capture Server gets the updated schema for the User Table, which identifies the new column— "Name"—and indicates that the data type is a character string. In this example, the Database Server updated the User Table with the new column and Updated the Information Schema before the Metadata Capture Server retrieved the updated schema for the User Table from the Information Schema.

In step 4, the Metadata Capture Server sends a query to the Database Server to add a new record in the Metadata Table in the Metadata Database, and store data in the new record that defines the new schema for the User Table in the User Database, which includes the new column. Accordingly, the Database Server receives and executes the query, creating a new record in the Metadata Table in the Metadata Database. The new record includes data that indicates the current schema for the User Table in the User Database, which includes the new column—"Name"—and indicates that the data type is a character string. Additionally or alternatively, the Metadata Capture Server includes one or more features of the DDL query in the query sent to the database server. Accordingly, the new record in the Metadata Table may include the one or more features of the DDL query.

Additionally or alternatively, the Metadata Capture Server determines the change(s) to the schema(s) of the database object(s) referenced in the DDL query based on one or more features in the DDL query included in the DDL Notification. The Metadata Capture Server sends a query to the Database Server to add a new record in the Metadata Table in the Metadata Database, and store data in the new record that indicates the change(s) to the schema(s) of the database object(s) referenced in the DDL query. Accordingly, the Database Server receives and executes the query, creating a new record in the Metadata Table in the Metadata Database. Accordingly, in this example, the new record includes data that indicates the User Table in the User Database includes a new column—"Name"—and indicates that the data type is a character string.

In step 5, the metadata is logged in a database transaction log by the database server. For example, the query that the Metadata Capture Server sends to the Database Server, which adds a row to a Metadata Table, is a DML query. In response, the Database Server may activate a trigger in response to processing the DML query and store the record or data from the record or the DML query in the Database Transaction Log.

In step 6, the Extraction Process reads the metadata stored in the Database Transaction Logs, which may include or be based on the DDL query. In step 7, the Extraction Process generates the Trail Files from the DDL query or metadata retrieved from the Database Transaction Logs. Another process, not illustrated in FIG. 2, can duplicate the User Database on another computer from the Trail Files. The duplicated User Database will include a User Table that has the same schema including the new "Name" column, and the data type will be a character string. And data that is stored in the User Table in the User Database will also be included in the User Table in the duplicate User Database.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
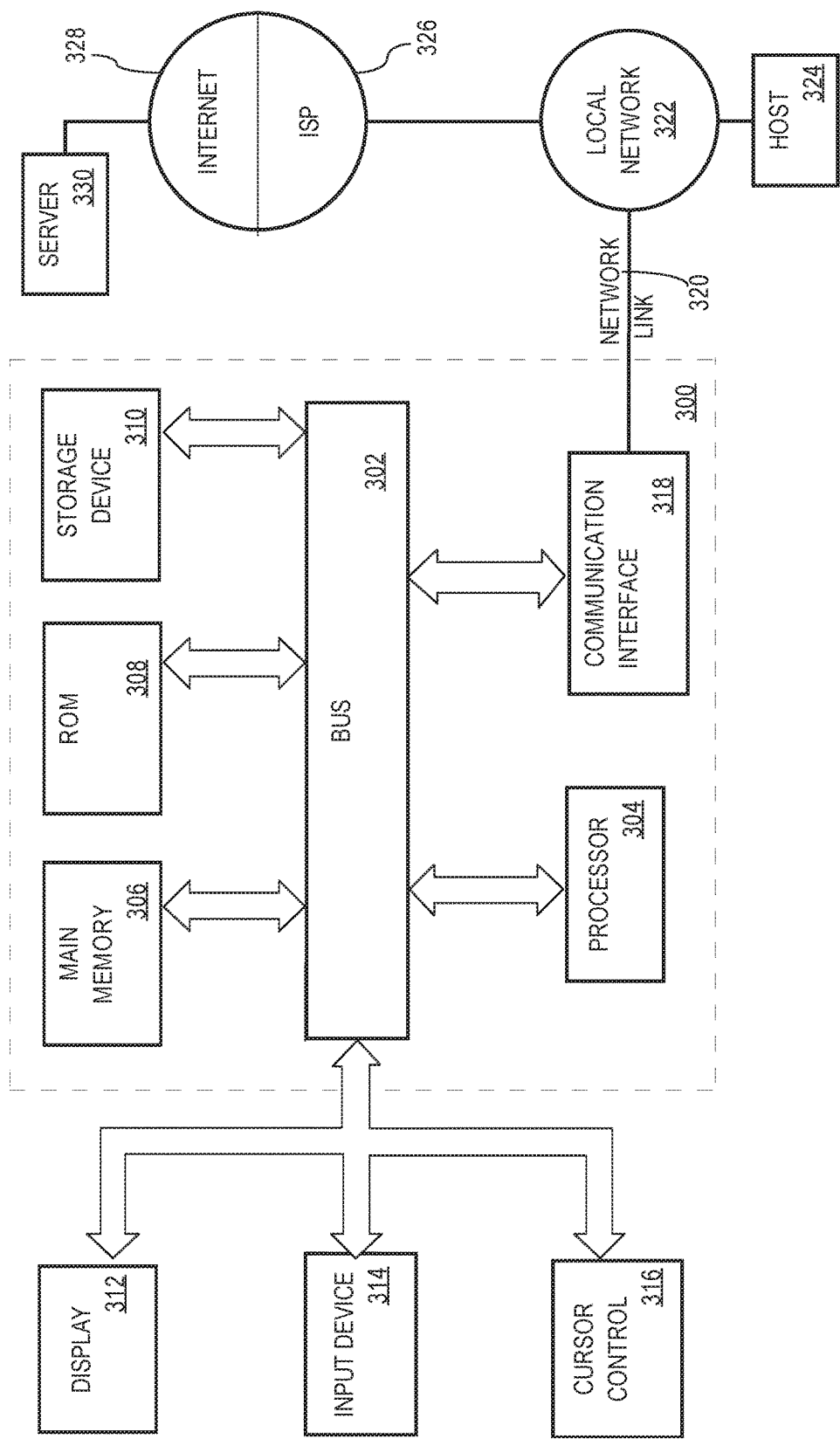
FIG. 3 is a block diagram that illustrates a computer system 400 upon which an embodiment of the invention may be implemented, in an example embodiment.

For example, FIG. 3 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving, at a database server from a client computing device, a first query that targets a first database managed by the database server, wherein the first query specifies a first set of one or more database operations to be performed by the database server;
    after receiving the first query at the database server, determining, by a plugin registered with the database server, that the first query is a first type of query;
    in response to determining that the first query is the first type of query, the plugin causing a message to be sent to a process that is external to the database server and external to the client computing device, wherein the message includes one or more features of the first query;
    executing, at the database server, the first query to perform the first set of one or more database operations;
    performing, by the process that is external to the database server:
        responsive to receiving the message from the plugin, generating a new query based on the one or more features, wherein the new query specifies a second set of one or more database operations that are different than the first set of one or more database operations; and
        sending the new query to the database server, wherein the new query includes information that is based on the one or more features; and
    executing the new query in the database server to perform the second set of one or more database operations.

2. The method of claim 1 wherein:
    the first type of query is a Data Definition Language (DDL) query that targets a particular table in the first database;
    the particular table has a first structure prior to execution of the DDL query and a second structure after execution of the DDL query; and
    the one or more features indicate information about the second structure of the particular table.

3. The method of claim 1 wherein executing the new query causes at least one operation to be performed in a second database that is different than the first database.

4. The method of claim 1, wherein:
    a particular feature of the one or more features identifies a particular table in the first database with a first schema;
    the first query, when executed by the database server, produces a second schema for the particular table in the first database;
    the second schema is different than the first schema; and
    the new query causes the database server to store a record in a second table, wherein the record includes data that defines the second schema.

5. The method of claim 4 comprising:
    in response to the new query, updating a transaction log with data from the record;
    based on the transaction log, generating a trail file; and
    using the trail file to duplicate at least a portion of the first database.

6. The method of claim 1, wherein determining whether the first query is the first type of query comprises determining that the first query comprises one or more particular keywords.

7. The method of claim 1, wherein the database server and the process that is external to the database server are executed on different computers.

8. The method of claim 1, further comprising, in response to determining that the first query is the first type of query, sending a notification to the client computing device identifying the first type of query and one or more actions available to the client computing device.

9. The method of claim 8, wherein the one or more actions are based on the first type of query.

10. The method of claim 1, wherein:
    the plugin is registered with the database server via an application programming interface; and
    the new query performs an operation that is not supported by the application programming interface.

11. The method of claim 1, wherein the process that is external to the database server has a thread that listens for messages sent from the plugin and creates a new thread to process each message received from the plugin.

12. One or more non-transitory computer-readable media having stored thereon instructions which, when executed by one or more computing devices, cause a database server to perform:
    receiving, from a client computing device, a first query that targets a first database managed by the database server, wherein the first query specifies a first set of one or more database operations to be performed by the database server;
    after receiving the first query at the database server, determining, by a plugin registered with the database server, that the first query is a first type of query;
    in response to determining that the first query is the first type of query, the plugin causing a message to be sent to a process that is external to the database server and external to the client computing device, wherein the message includes one or more features of the first query;

executing the first query to perform the first set of one or more database operations;

performing, by the process that is external to the database server:

responsive to receiving the message from the plugin, generating a new query based on the one or more features, wherein the new query specifies a second set of one or more database operations that are different than the first set of one or more database operations; and sending the new query to the database server, wherein the new query includes information that is based on the one or more features; and executing the new query in the database server to perform the second set of one or more database operations.

13. The one or more non-transitory computer-readable media of claim 12 wherein:

the first type of query is a Data Definition Language (DDL) query that targets a particular table in the first database;

the particular table has a first structure prior to execution of the DDL query and a second structure after execution of the DDL query; and the one or more features indicate information about the second structure of the particular table.

14. The one or more non-transitory computer-readable media of claim 12 wherein executing the new query causes at least one operation to be performed in a second database that is different than the first database.

15. The one or more non-transitory computer-readable media of claim 12, wherein:

a particular feature of the one or more features identifies a particular table in the first database with a first schema;

the first query, when executed, produces a second schema for the particular table in the first database;

the second schema is different than the first schema; and the new query causes the database server to store a record in a second table, wherein the record includes data that defines the second schema.

16. The one or more non-transitory computer-readable media of claim 15 further having stored thereon instructions which, when executed by one or more computing devices, cause the database server to perform:

in response to the new query, updating a transaction log with data from the record;

based on the transaction log, generating a trail file; and using the trail file to duplicate at least a portion of the first database.

17. The one or more non-transitory computer-readable media of claim 12, wherein determining whether the first query is the first type of query comprises determining that the first query comprises one or more particular keywords.

18. The one or more non-transitory computer-readable media of claim 12, wherein the database server and the process that is external to the database server are executed on different computers.

19. The one or more non-transitory computer-readable media of claim 12, wherein:

the plugin is registered with the database server via an application programming interface; and the new query performs an operation that is not supported by the application programming interface.

20. The one or more non-transitory computer-readable media of claim 12, wherein the process that is external to the database server has a thread that listens for messages sent from the plugin and creates a new thread to process each message received from the plugin.

* * * * *